United States Patent
Pulici et al.

(10) Patent No.: US 11,433,631 B2
(45) Date of Patent: Sep. 6, 2022

(54) METHOD FOR DEPOSITING A PIECE OF BAND-LIKE ELASTOMERIC ELEMENT ON A FORMING SUPPORT IN A PROCESS FOR BUILDING A TYRE FOR VEHICLE WHEELS

(71) Applicant: PIRELLI TYRE S.P.A, Milan (IT)

(72) Inventors: Lorenzo Pulici, Milan (IT); Stefano Paleari, Milan (IT)

(73) Assignee: PIRELLI TYRE S.P.A., Milan (IT)

( * ) Notice: Subject to any disclaimer, the term of this patent is extended or adjusted under 35 U.S.C. 154(b) by 292 days.

(21) Appl. No.: 15/102,764

(22) PCT Filed: Dec. 12, 2014

(86) PCT No.: PCT/IB2014/066843
§ 371 (c)(1),
(2) Date: Jun. 8, 2016

(87) PCT Pub. No.: WO2015/087289
PCT Pub. Date: Jun. 18, 2015

(65) Prior Publication Data
US 2016/0361883 A1 Dec. 15, 2016

(30) Foreign Application Priority Data
Dec. 13, 2013 (IT) .............................. MI2013A2078

(51) Int. Cl.
*B29D 30/30* (2006.01)
*B29D 30/44* (2006.01)
(Continued)

(52) U.S. Cl.
CPC ............. *B29D 30/44* (2013.01); *B29D 30/30* (2013.01); *B29D 30/3007* (2013.01);
(Continued)

(58) Field of Classification Search
CPC .... B29D 30/28; B29D 30/30; B29D 30/3007; B29D 30/44; B29D 2030/4443;
(Continued)

(56) References Cited

U.S. PATENT DOCUMENTS

| 4,163,685 A | 8/1979 | Kubinski | |
| 4,769,104 A * | 9/1988 | Okuyama | B29D 30/3007 |
| | | | 156/406.4 |

(Continued)

FOREIGN PATENT DOCUMENTS

| CN | 101132904 A | 2/2008 |
| DE | 2105765 A1 | 8/1972 |

(Continued)

OTHER PUBLICATIONS

ID Landau et al., Adaptive Control Algorithms Analysis and Applications, Ch. 1, pp. 1-33 (2011).*

(Continued)

*Primary Examiner* — Geoffrey L Knable
(74) *Attorney, Agent, or Firm* — Steinfl + Bruno LLP

(57) ABSTRACT

A method for depositing a piece of band-like elastomeric element on a forming support in a process for building a tyre for vehicle wheels. The method includes feeding a piece of band-like elastomeric element having a predetermined nominal length towards the forming support along a predetermined feeding direction and measuring the actual length of the piece along the feeding direction. If the actual length is lower than or equal to a circumferential length of a deposition surface defined on the forming support, the piece is deposited on the deposition surface while the forming support rotates about a rotation axis thereof. During such deposition the piece is pressed on the deposition surface with a pressing force selected as a function of the actual length.

13 Claims, 5 Drawing Sheets

(51) Int. Cl.
*G01B 21/04* (2006.01)
*G01B 11/04* (2006.01)
*B29K 21/00* (2006.01)

(52) U.S. Cl.
CPC ........ B29D 30/3042 (2013.01); G01B 11/043 (2013.01); G01B 21/042 (2013.01); *B29D 2030/4443* (2013.01); *B29K 2021/00* (2013.01)

(58) Field of Classification Search
CPC ............ B29D 2030/546; G01B 11/022; G01B 11/043; G01B 21/042
See application file for complete search history.

(56) References Cited

U.S. PATENT DOCUMENTS

| | | | | |
|---|---|---|---|---|
| 4,974,077 | A | * | 11/1990 | Kusaba ................ G01B 11/028 382/141 |
| 5,194,107 | A | * | 3/1993 | Okuyama .......... B29D 30/3007 156/123 |
| 5,273,600 | A | * | 12/1993 | Yamamori ............. B29D 30/28 156/123 |
| 5,389,187 | A | | 2/1995 | Marks et al. |
| 5,534,093 | A | | 7/1996 | Marks et al. |
| 5,935,377 | A | | 8/1999 | Sergel et al. |
| 6,105,648 | A | | 8/2000 | De Graaf et al. |
| 7,694,709 | B2 | * | 4/2010 | Kaagman ................ B65H 9/20 156/360 |
| 8,171,619 | B2 | * | 5/2012 | Slots .................. B29D 30/3007 156/394.1 |
| 10,179,440 | B2 | | 1/2019 | Pulici |
| 2001/0008162 | A1 | | 7/2001 | Shimizu et al. |
| 2007/0003649 | A1 | | 1/2007 | Kaagman et al. |
| 2007/0102121 | A1 | | 5/2007 | Saamer |
| 2008/0314503 | A1 | | 12/2008 | Di Edidio et al. |

FOREIGN PATENT DOCUMENTS

| | | | |
|---|---|---|---|
| DE | 2806973 | A1 | 8/1979 |
| DE | 2819410 | A1 | 11/1979 |
| EP | 1120234 | A2 | 8/2001 |
| GB | 1421679 | A * | 1/1976 |
| GB | 1421679 | A | 1/1976 |
| GB | 2208159 | A | 3/1989 |
| JP | 01-173803 | A * | 7/1989 |
| JP | H03 190726 | A | 8/1991 |
| JP | H03190726 | A | 8/1991 |
| JP | 07-009586 | A * | 1/1995 |
| JP | H079586 | A | 1/1995 |
| JP | 2805513 | B2 | 9/1998 |
| JP | 2001-310397 | A * | 11/2001 |
| JP | 2007-163340 | A * | 6/2007 |
| JP | 2009-115715 | A * | 5/2009 |
| RU | 2343073 | C2 | 1/2009 |
| WO | 2009/131451 | | 10/2009 |

OTHER PUBLICATIONS

Hahn, J. and Edgar, T. F. 2003. Process Control. Kirk-Othmer Encyclopedia of Chemical Technology.*
International Search Report issued for International Application No. PCT/IB2014/066843 filed on Dec. 12, 2014 in the name of Pirelli Tyre S.P.A. dated Aug. 6, 2015.
Written Opinion issued for International Application No. PCT/IB2014/066843 filed on Dec. 12, 2014 in the name of Pirelli Tyre S.P.A. dated Aug. 6, 2015.
First Office Action for Chinese Patent Application No. 201480071528.6 dated Jul. 21, 2017. 14 pages. (English Translation + Chinese original).
Office Action for Russian Patent Application 2016127922/05 filed Internationally Dec. 12, 2104 on behalf of Pirelli Tyre S.P.A. dated Jul. 13, 2018. 9 pages. (English translation + Russian Original).
Russian Search Report for Russian Patent Application No. 2016127922/05 filed internationally Dec. 12, 2014 on behalf of Pirelli Tyre S.P.A. dated Jul. 12, 2018. 4 pages. (English translation + Russian Original).
International Preliminary Report on Patentability for International Application No. PCT/IB2014/066843 filed Dec. 12, 2014 on behalf of Pirelli Tyre S.P.A. dated Jun. 14, 2016. 7 pages. (English Only).
First Brazilian Office Action for Brazilian Application No. BR112016013468-0 filed on Dec. 12, 2014 on behalf of Pirelli Tyre S.P.A. dated Feb. 4, 2020. 6 pgs (English + Original).

* cited by examiner

METHOD FOR DEPOSITING A PIECE OF BAND-LIKE ELASTOMERIC ELEMENT ON A FORMING SUPPORT IN A PROCESS FOR BUILDING A TYRE FOR VEHICLE WHEELS

CROSS REFERENCE TO RELATED APPLICATIONS

The present application is the U.S. national stage entry of International Patent Application No. PCT/IB2014/066843, filed internationally on Dec. 12, 2014 which, in turn, claims priority to Italian Patent Application No. MI2013A002078, filed on Dec. 13, 2013.

The present invention relates to a method and an apparatus for depositing a piece of band-like elastomeric element on a forming support in a process for building a tyre for vehicle wheels.

The method and the apparatus of the invention are preferably used in the building of tyres for wheels of four-wheeled heavy transportation vehicles (like lorries, trucks, tractors, articulated vehicles, buses, trailers, and other vehicles of this type), and in particular in the operations for depositing a tread band on a belt structure previously built on the forming support.

The four-wheeled heavy transportation vehicles to which reference is made belong to categories M2~M3, N2~N3 and O2~O4 defined in "Consolidate Resolution of the Construction of Vehicles (R.E.3) (1997)", Annex 7, pages 52-59, "Classification and definition of power-driven vehicles and trailers".

Hereinafter, the term "elastomeric" is used to refer to a composition comprising at least one elastomeric polymer and at least one reinforcing filler. Preferably, such a composition also comprises additives like, for example, a cross-linking agent and/or a plasticizer. Thanks to the presence of the cross-linking agent, such a material can be cross-linked through heating, so as to form the end product.

The terms "radial" and "axial" and the expressions "radially inner/outer" and "axially inner/outer" are used with reference to the radial direction of the forming support being used (i.e. to a direction perpendicular to the rotation axis of the aforementioned forming support) and to the axial direction of the forming support being used (i.e. to a direction parallel to the rotation axis of the aforementioned forming support). The terms "circumferential" and "circumferentially", on the other hand, are used with reference to the annular extension of the aforementioned forming support.

The expression "piece of band-like elastomeric element" is used to indicate a portion of predetermined length obtained through a cutting operation of a continuous band-like elastomeric element. For the sake of simplicity it will often be used the term "piece" to indicate the aforementioned piece of band-like elastomeric element.

The expression "nominal length" is used to indicate the length at which the aforementioned cutting operation is carried out.

The expression "circumferential length", with reference to a substantially cylindrical deposition surface, is used to indicate the length of a longitudinal extension in plan of said deposition surface.

The expression "theoretical line" is used to indicate a line that in reality is not present and that is determined after appropriate calculations.

With upper/lower "face" of a tread band it is intended the surface that is located in a radially inner/outer position once the tread band itself is deposited on the forming support.

A tyre for vehicle wheels generally comprises a carcass structure comprising at least one carcass ply formed of reinforcing cords incorporated in a matrix of elastomeric material. The carcass ply has end edges respectively engaged with annular anchoring structures. The latter are arranged in the areas of the tyre usually identified with the name "beads" and are normally each formed by a substantially circumferential annular insert on which at least one filling insert is applied, in a radially outer position thereof. Such annular inserts are commonly identified as "bead cores" and they have the task of keeping the tyre firmly fixed to the anchoring seat specifically provided in the rim of the wheel, thus preventing, in operation, the radially inner end edge of the tyre from coming out from such a seat.

Specific reinforcing structures having the function of improving the torque transmission to the tyre can be provided at the beads.

A crown structure is associated in a radially outer position with respect to the carcass structure, the crown structure comprising a belt structure and, in a radially outer position with respect to the belt structure, a tread band.

The belt structure comprises one or more belt layers arranged radially one on top of the other and having textile or metallic reinforcing cords with a crossed orientation and/or an orientation substantially parallel to the direction of circumferential extension of the tyre.

A layer of elastomeric material, called "under-belt", can be provided between the carcass structure and the belt structure, said layer having the function of making the radially outer surface of the carcass structure as uniform as possible for the subsequent application of the belt structure.

The tread band is made of elastomeric material too.

A so-called "under-layer" made of elastomeric material can be arranged between the tread band and the belt structure, the under-layer having properties suitable for ensuring a steady union of the tread band to the belt structure.

On the side surfaces of the carcass structure, each extending from one of the side edges of the tread band up to the respective annular anchoring structure to the beads, respective sidewalls of elastomeric material are applied.

With particular reference to the tread band, after it has been made, it is generally stored together with a plurality of other tread bands in a suitable storage device, from which it is later taken to be deposited on a forming support.

US 2001/0008162 describes a method for winding a band-like element on a building drum. The band-like element is fed to the building drum by a conveyor belt to then be wound on the building drum. Conveyor belt and building drum are actuated at the same speed. Through a sensor pointed on the building drum the passage of the head end of the band-like element being wound is detected. Through another sensor pointed on the conveyor belt the passage of the tail end of the band-like element is detected and consequently the length of the portion of band-like element that still has to be wound on the building drum is measured. Thus the ratio between the aforementioned length and the circumferential length of the portion of building drum on which the band-like element still has to be deposited is calculated and only when such a ratio is within a predetermined range of values does the winding proceed, otherwise such winding is stopped.

The Applicant has observed that, in the winding operations of a piece of band-like elastomeric element on a forming support in a process for building tyres for vehicle wheels, like for example the operations for depositing a tread band on a radially outer surface of a belt structure previously deposited on the forming support, it is necessary to ensure that at the end of the winding the piece has a high surface homogeneity in the circumferential direction.

According to the Applicant, in order to obtain the desired circumferential homogeneity it is necessary to obtain a high precision in the join between head end and tail end of the piece deposited on the forming support. In other words, It Is necessary that at the end of the winding of the piece on the forming support the head end of the piece is set at an extremely precise position close to the tail end of the same piece.

The Applicant has noted that, typically, the aforementioned piece is cut from a continuous band-like elastomeric element to a length shorter than the circumferential length of the deposition surface on the forming support. In such circumstances, in order to obtain the desired mutually close positioning of head end and tail end of the piece on the forming support it is often necessary for a skilled worker to carry out a manual intervention. Such a worker has in particular to detach the tail end of the piece from the respective deposition surface defined on the forming support, pull the aforementioned tail end towards the head end of the piece and, finally, position the aforementioned tail end with precision side by side to the aforementioned head end.

The Applicant has verified that, due to the intrinsic stickiness of the elastomeric material and, in the specific case of pieces with high thickness (like for example the tread bands for heavy transportation vehicles), to the tensile strength thereof, manually bringing the head end and tail end of the piece side by side requires, in addition to the necessary care, a substantial physical effort from the worker.

The Applicant has also observed that, again in the specific case of a tread band, such a worker is also required to make a further physical effort to transfer the tread band from the storage device to the feeding device for feeding the tread band towards the forming support, upon removal of the service fabric typically provided on a lower face of the tread band to protect and preserve the adhesiveness of such a face. Regarding this, it should be considered that the tread bands for heavy transportation vehicles can weigh over 35 kg, have a length of over 3.5 metres and a thickness of up to about 3 cm.

The Applicant has also noted that the physical effort that the worker must endure is further worsened by the high speed and frequency with which he must carry out the aforementioned operations of removal of the service fabric from the tread band, transferring the tread band to the aforementioned teeding device and bringing the head and tail ends of the piece side by side on the forming support. This is due to the ever-present need to have cycle times that are as short as possible in order to increase productivity.

Basically, the Applicant has verified that, with cycle times of the order for example of a few minutes, the aforementioned operations, in addition to be particularly tiring for the worker, almost entirely occupy all of the worker's time, thus preventing him from performing other tasks, like for example the preparation of other materials to make other tread bands or to build other components of the tyre. Moreover, the great physical effort undergone by the worker inevitably impacts negatively upon the required precision in the piece head-tail joining operation on the forming support.

The Applicant has also observed that, even independently from the considerations outlined above concerning the physical effort/time taken up by the worker, manually bringing the head end and tail end of the piece of band-like elastomeric element side by side on the forming support frequently results in a poor quality head-tail joint due to the difficulty for the worker to pull the entire end edge of the top of the piece evenly. It is also impossible to ensure the repeatability of the aforementioned joint for different pieces.

In light of everything outlined above, the Applicant has felt the need to make the head-tail joining operations of the piece of band-like elastomeric element on the forming support totally automatic, i.e. without the need for manual intervention by the worker. This is both to lighten the worker's workload, who can thus perform other tasks, at the same time keeping extremely short cycle times, and to ensure high standards in terms of precision and repeatability of the aforementioned head-tail joint.

The Applicant has realised that an essential requirement for automatically obtaining a head-tail joint with high precision and repeatability is knowing the actual length of the piece being deposited on the forming support. According to the Applicant, indeed, once such information has been obtained, it is possible to compare such a dimension with the circumferential length of the deposition surface provided on the forming support (such a circumferential length being known from design or after suitable measurement), so as to precisely determine, only in the cases in which the actual length of the piece is lower than the aforementioned circumferential length, the amount of stretching deformation (or length correction) that the piece being deposited on the forming support must be subjected to so that, at the end of the deposition, such a piece has a length substantially equal to the circumferential length of the deposition surface.

The Applicant has also realised that such stretching (or length correction) can be advantageously obtained through the effect of a pressing or squashing action of said piece against the deposition surface.

The Applicant has thus found that, knowing the circumferential length of the deposition surface defined on the forming support and having measured the actual length of the piece fed towards said deposition surface, it is possible to automatically obtain a precise and repeatable joint of the head and tail end of the aforementioned piece, once the piece has been deposited on the forming support, by exerting a pressing force on said piece as a function of the actual length of the piece, and thus of the stretching that is wished to be obtained in the piece to have its length equal to the circumferential length of the deposition surface.

The present invention therefore relates, in a first aspect thereof, to a method for depositing a piece of band-like elastomeric element on a forming support in a process for building a tyre for vehicle wheels.

Preferably, the method comprises feeding a piece of band-like elastomeric element having a predetermined nominal length towards said forming support along a predetermined feeding direction.

Preferably, the method comprises measuring the actual length of said piece of band-like elastomeric element along said feeding direction.

Preferably, if said actual length is lower than or equal to a circumferential length of a deposition surface defined on the forming support, said piece of band-like elastomeric element is deposited on said deposition surface while said forming support rotates about a rotation axis thereof.

Preferably, if said actual length is lower than said circumferential length of said deposition surface, during the deposition of said piece of band-like elastomeric element on said deposition surface said piece of band-like elastomeric element is pressed onto said deposition surface with a pressing force selected as a function of said actual length.

Preferably, the pressing force is such as to stretch said piece so that, at the end of the deposition of said piece, said actual length substantially coincides with said circumferential length of said deposition surface.

The Applicant considers that, thanks to the prior measurement of the actual length of the piece about to be deposited on the forming support and to the application, during the deposition of such a piece on the forming support and in cases in which the actual length of the piece is lower than the length of the deposition surface, of a pressing force whose amount is calculated as a function of the actual length measured beforehand, it is possible to obtain a stretching of the piece by an amount such as to ensure that such a piece reaches a length substantially equal to the circumferential length of the deposition surface, thus obtaining a precise and repeatable joint of the head and tail end of the piece deposited on the forming support.

In a second aspect thereof, the present invention relates to an apparatus for depositing a piece of band-like elastomeric element on a forming support in a process for building a tyre for vehicle wheels.

Preferably, the apparatus comprises at least one feeding conveyor belt for feeding said piece of band-like elastomeric element towards said forming support along a feeding direction.

Preferably, the apparatus comprises a detection device for detecting the actual length of said piece of band-like elastomeric element along said feeding direction.

Preferably, the apparatus comprises a deposition device for depositing said piece of band-like elastomeric element on a deposition surface defined on the forming support.

Preferably, said deposition device is arranged downstream of said detection device with reference to said feeding direction.

Preferably, the apparatus comprises a pressing device for pressing said piece of band-like elastomeric element on said forming support.

Preferably, the apparatus comprises a control system of said pressing device that, during a deposition of said piece commanded by said deposition device and when said actual length is lower than a circumferential length of said deposition surface, activates said pressing device in order to stretch said piece so that, at the end of the deposition of said piece, said actual length substantially coincides with said circumferential length.

The Applicant believes that such an apparatus allows to obtain the technical effects discussed above. In particular, thanks to the provision of the aforementioned detection device which detects the actual length of the piece and of the aforementioned control system of the pressing device it is possible to apply to the piece being deposited on the forming support, and through the pressing device, a pressing force whose amount is a function of the actual length of such a piece, so that, only in the cases in which the actual length of the piece is lower than the length of the deposition surface, a stretching of the piece is obtained by an amount such as to allow a precise and repeatable joining of the head and tail end of the piece deposited on the forming support.

The present invention, in at least one of the aforementioned aspects, can have at least one of the following preferred characteristics, taken individually or in combination.

Preferably, said piece of band-like elastomeric element is a tread band.

Preferably, said pressing force is obtained from a correlation table (or curve) between pressing force and actual length acquired in a previous calibration process.

Advantageously, said table (or curve) is defined as a function of the geometry of the piece and of the compound used.

In preferred embodiments, said correlation table (or curve) can be modified in real time based on a feedback coming from a previous deposition of a different piece of band-like elastomeric element.

Preferably, the piece of band-like elastomeric element deposited previously has the same geometry as the piece being deposited.

Preferably, the piece of band-like elastomeric element deposited previously has the same compound as the piece being deposited.

The aforementioned feedback preferably is a qualitative information on the outcome of the length correction applied in the previous deposition. In other words, it is detected whether such a previous correction was insufficient, correct, or excessive, so as to consequently adapt in real time the correlation table (or curve) to ensure an increasingly precise head-tail joint.

Preferably, measuring the actual length of said piece of band-like elastomeric element comprises:
  detecting a first instant of passage of a head end of said piece of band-like elastomeric element.

More preferably, measuring the actual length of said piece of band-like elastomeric element comprises:
  detecting a second instant of passage of a tail end of said piece of band-like elastomeric element.

Even more preferably, measuring the actual length of said piece of band-like elastomeric element comprises:
  calculating the actual length of said piece of band-like elastomeric element based on the detection of said first instant and second instant.

Preferably, detecting said second instant comprises:
  determining, starting from said first instant, the instant at which said piece of band-like elastomeric element moved along said feeding direction by a length equal or close to said nominal length.

The determination of the instant at which the aforementioned movement takes place is made possible by the fact that, in addition to be known the nominal length of the piece, it is known from design or it is detectable in real time the speed at which the piece moves towards the forming support.

Preferably, calculating the actual length of said piece of band-like elastomeric element comprises:
  acquiring a first image of said tail end at said second instant. More preferably, calculating the actual length of sold piece of band-like elastomeric element comprises:
  comparing said first image with a reference image acquired in a previous calibration process.

Even more preferably, calculating the actual length of said piece of band-like elastomeric element comprises:
  determining the actual length of said piece of band-like elastomeric element based on the comparison between said first image and said reference image.

In preferred embodiments, said first image and said reference image are acquired through a telecamera.

The use of a telecamera is particularly advantageous since it makes it possible to obtain a real image of the tail end of the piece and to work on such a real image. Thus is of particular importance in those cases in which the tail end of the piece has an irregular profile, like for example in cases in which the piece is a tread band. In this case, indeed, there is an irregular profile caused by the fact that the tail end of the piece is cut along a certain cutting direction forming, with the longitudinal direction of the piece, a cutting angle that is different from a right angle. A detection of such an irregular profile through a sensor would, indeed, be difficult and not very meaningful.

Preferably, comparing said first image with a reference image comprises:
  determining in said first image the position of a first theoretical line representative of said tail end.

Such a theoretical line is preferably determined through a suitable calculation algorithm on the basis of the actual profile of the tail end of the piece.

Preferably, at the end of the deposition of said piece of band-like elastomeric element on said deposition surface, it is foreseen to:
  invert at least once the direction of rotation of said forming support;
  increase said pressing force by a predetermined value.

The consolidation of the head/tail joint of the piece on the forming support is thus obtained.

Preferably, said inversion of direction of rotation is repeated at least a couple of times.

Preferably, pressing said piece of band-like elastomeric element comprises pressing, instant by instant, two circumferentially adjacent portions of piece deposited on said deposition surface.

Such a provision results in greater efficiency of the pressing action and therefore a more immediate stretching of the piece being deposited on the forming support.

Preferably, said pressing force has different values along a direction substantially perpendicular to said feeding direction.

In this way there is the possibility of adapting the pressing action to the specific length of the various areas of the thickness. In particular, possible areas of shorter length with respect to others can be pressed more than the latter, so as to obtain an extremely precise head/tail joint.

Preferably, said piece of band-like elastomeric element is moved along said feeding direction up to said forming support with substantially constant feeding speed.

Advantageously, such a feeding speed is known or can be detected in real time and is a useful parameter for measuring the actual length of the piece.

Preferably, during the deposition of said piece of band-like elastomeric element on said deposition surface, the rotation speed of said forming support is increased by a predetermined value selected as a function di said pressing force.

Such a provision produces a variation in length of the piece being deposited, which aids the variation in length obtained through the effect of the application on the piece of the aforementioned pressing force.

Preferably said pressing force (possibly aided by the increase in relative speed of the forming support with respect to the feeding speed of the piece) produces a stretching of said piece of band-like elastomeric element up to a maximum of 5% of its actual length measured along said feeding direction.

In preferred embodiments, if said actual length is greater than said circumferential length of said deposition surface defined on the forming support, said piece of band-like elastomeric element is discarded.

Preferably, said detection device comprises at least one telecamera. The use of a telecamera is particularly advantageous for the reasons outlined above.

Preferably, said detection device comprises at least one contrast surface arranged on the opposite side to said at least one telecamera with respect to said at least one feeding conveyor belt.

Such a contrast surface is preferably luminous so as to allow extremely sharp acquisition of the images by the telecamera.

Preferably, at least two feeding conveyor belts are provided, arranged one after the other along said feeding direction.

The Applicant has found that providing two feeding conveyor belts makes it possible to obtain an optimal compromise between economy of process and bulk in plan of the apparatus. Indeed, it is possible to store a first piece on a first conveyor belt adjacent to the forming support and a second piece on a second conveyor belt arranged upstream of said first conveyor belt with reference to the feeding direction towards the forming support so that the second piece can be transferred from the second conveyor belt to the first conveyor belt while the first piece leaves the first conveyor belt to be deposited on the forming support. Possibly, a third piece can be transferred to the second conveyor belt while the second piece leaves the second conveyor belt to move on the first conveyor belt.

Preferably, said detection device is operatively arranged between said two feeding conveyor belts. In this way, when the piece is positioned on the conveyor belt adjacent to the forming support, the actual measurement has already been detected.

Preferably, said pressing device is arranged downstream of said at least one feeding conveyor belt with reference to said feeding direction.

Preferably, said deposition device is pivoted at an end of said at least one feeding conveyor belt.

Preferably, a first motor group is used for moving said deposition device with respect to said at least one feeding conveyor belt. Such a motor group makes it possible to obtain the correct positioning of the deposition device with respect to the forming support when it is necessary to proceed with the deposition of the piece on the forming support.

Preferably, said deposition device comprises a centring device for centring said piece of band-like elastomeric element. Such a centring device allows the correct positioning of the piece on the forming support.

In preferred embodiments, said pressing device is mounted on said deposition device. The pressing device thus moves towards the forming support together with the deposition device.

Preferably, a second motor group is used for moving said pressing device with respect to said deposition device.

The control of the pressing device to carry out the application operation of the pressing force on the piece being deposited on the forming support is therefore independent from the control of the deposition device to carry out a deposition operation of the piece on the forming support. This makes it possible, each time, to press a portion of piece on the forming support after such a portion of piece has been deposited on the forming support.

Preferably, said second motor group is mounted on said deposition device.

In preferred embodiments, said pressing device comprises a plurality of rollers arranged one close to the other along a transversal direction substantially perpendicular to said feeding direction.

Preferably, said plurality of rollers comprises a first row of rollers aligned along said transversal direction and a second row of rollers aligned along a direction parallel to said transversal direction. This is in order to increase the efficiency of the pressing action exerted on the portion of piece being deposited on the forming support.

Preferably, the rollers of said second row of rollers are arranged in an offset position with respect to the rollers of said first row of rollers. In this way an extremely precise pressing action is obtained.

Preferably, each roller of said plurality of rollers is associated with a respective thrusting actuator through the interposition of a respective guided stem.

Such a guided stem absorbs the lateral components of the stress exerted on the rollers by the forming support in reaction to the pressing force exerted by the rollers against the forming support, thus preventing particularly delicate and/or expensive structural and functional components from breaking or becoming damaged due to the propagation of the aforementioned reaction stress up to such components.

Preferably, a plurality of electric valves are provided, each electric valve of said plurality of electric valves being associated with a respective group of rollers of said plurality of rollers.

The provision of a plurality of electric valves allows the application of pressing forces having different values on different areas of the piece along a direction substantially perpendicular to said feeding direction, so as to be able to adapt the pressing action to the specific width of the aforementioned areas.

Further characteristics and advantages of the present invention will become clearer from the following detailed description of preferred embodiments thereof, made with reference to the attached drawings. In such drawings.

Figure 1:
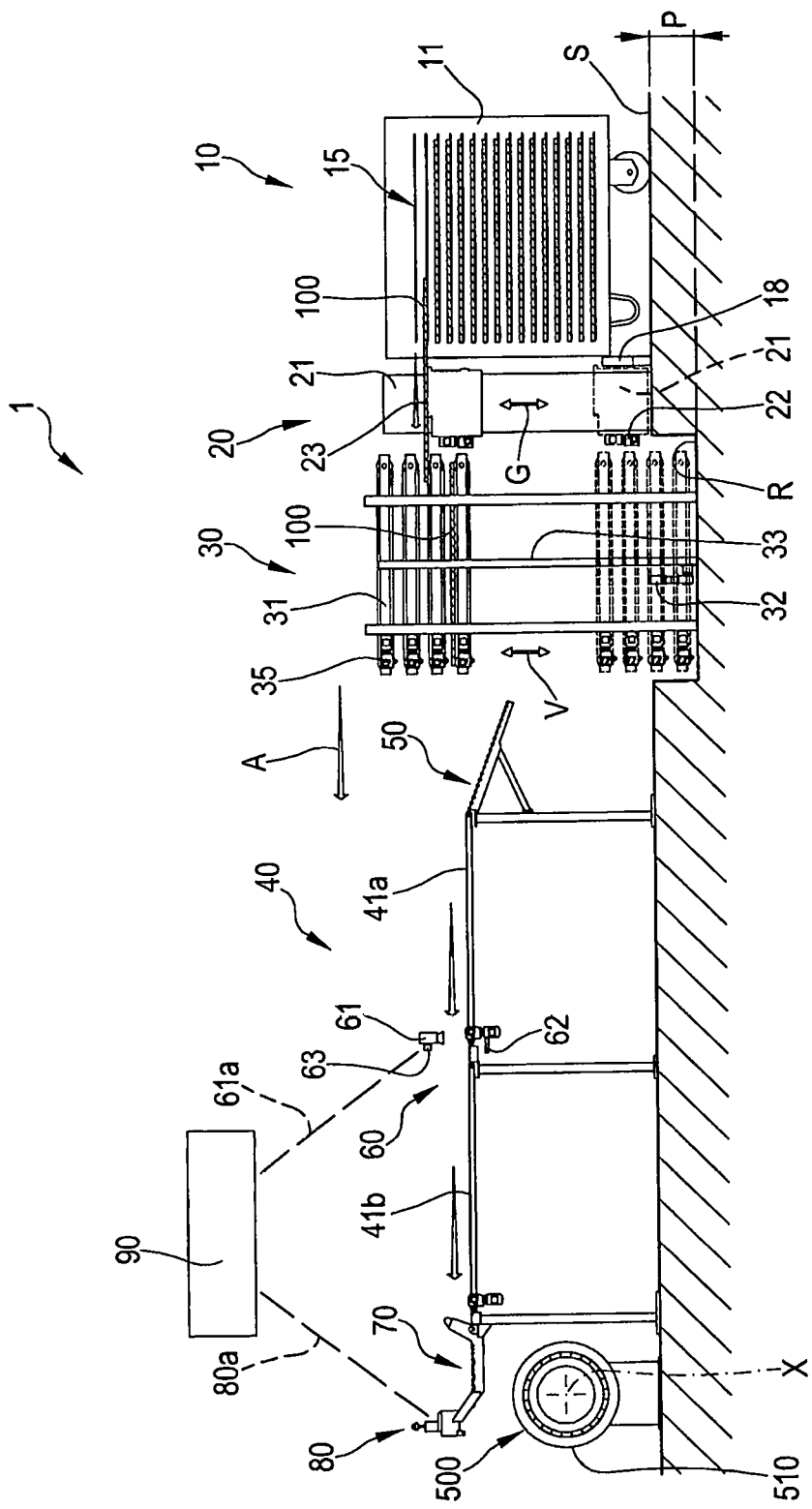
FIG. 1 is a schematic side view of an exemplary embodiment of an apparatus for depositing a piece of band-like elastomeric element on a forming support, in accordance with the present invention, the apparatus being represented in an operative configuration thereof.

In FIG. 1, reference numeral 1 wholly indicates an exemplary embodiment of an apparatus in accordance with the present invention. The apparatus 1 is used to deposit a piece 100 of band-like elastomeric element on a forming support 500 in a process for building a tyre for vehicle wheels.

Preferably (but not exclusively), the aforementioned tyre is intended to be mounted on heavy transportation vehicle wheels, as defined at the beginning of this description.

Hereafter, explicit reference is made to the exemplary case in which the aforementioned piece 100 is a tread band intended to be deposited on a belt structure previously built on the forming support 500. The radially outer surface of the belt structure, or the radially outer surface of a possible sub-layer deposited on the belt structure, thus defines a deposition surface 510 on which the tread band 100 is intended to be wound.

Figure 2:
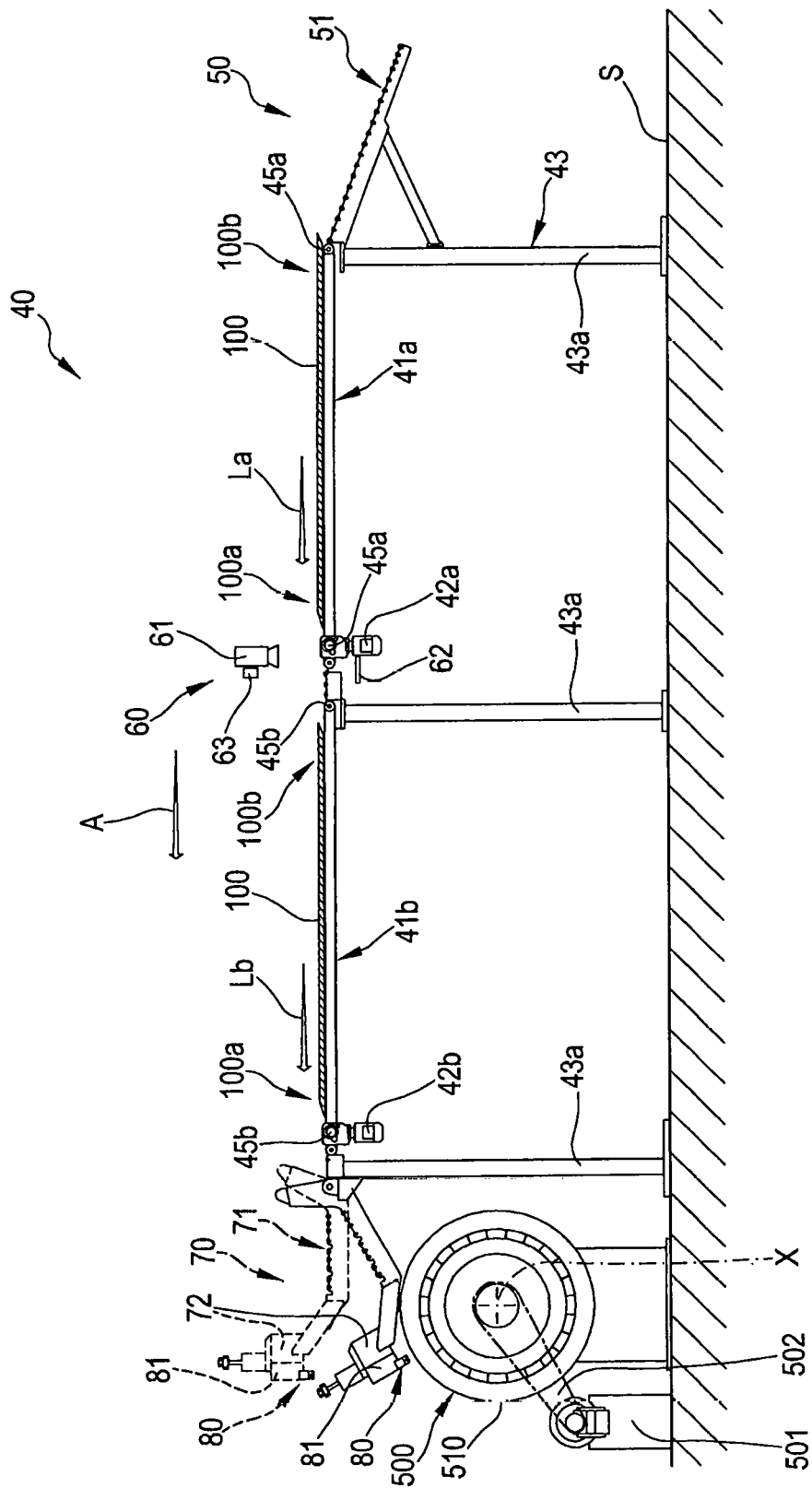
FIG. 2 is an enlarged schematic view of a detail of the apparatus of FIG. 1 in a subsequent operative configuration.

Each tread band 100 is fed towards the forming support 500 along a feeding direction indicated in FIGS. 1 and 2 with the arrow A.

The forming support 500 is preferably a substantially cylindrical drum. As illustrated in detail in FIG. 2, the forming support 500 can be commanded in rotation by a suitable motor group 501 through a suitable motion transfer member 502. In the specific example illustrated herein, the motion transfer member 502 used is a belt.

The tread band 100 is preferably made through an extrusion process of a compound made from elastomeric material.

In the specific case in which the tyre is intended to be mounted on a wheel of a heavy transportation vehicle, each tread band 100 preferably has the following dimensions:
  length comprised between about 1.5 m and about 5 m, preferably between about 2 m and about 4 m, more preferably between about 2.5 m and about 3.5 m;
  width comprised between about 100 mm and about 500 mm, preferably between about 130 mm and about 350 mm;
  thickness comprised between about 15 mm and about 35 mm, preferably between about 20 mm and about 30 mm.

Each tread band 100, in the abovementioned specific case, preferably has a weight variable between about 15 kg and about 40 kg, more preferably between about 20 kg and about 35 kg.

Each tread band 100 is cut to size to a predetermined nominal length, and with a predetermined cutting angle, from a continuous band-like elastomeric element (not shown). The aforementioned nominal length is selected as a function at least of the desired fitting diameter.

The direction along which the cutting takes place forms, with the longitudinal direction of the tread band 100, said cutting angle, which is different from a right angle.

After the aforementioned cutting the tread band 100 has a portion of head end 100a and a portion of tail end 100b, with reference to the feeding direction A.

Figure 6:
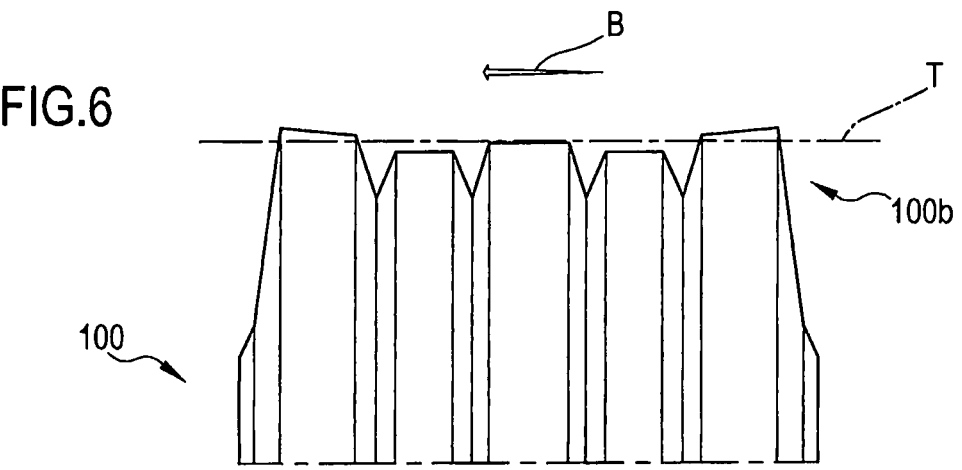
FIG. 6 illustrates an end portion of a piece of band-like elastomeric element in a perspective view thereof from above with respect to the ground during the normal operation of the apparatus of FIG. 1.
Figure 7:
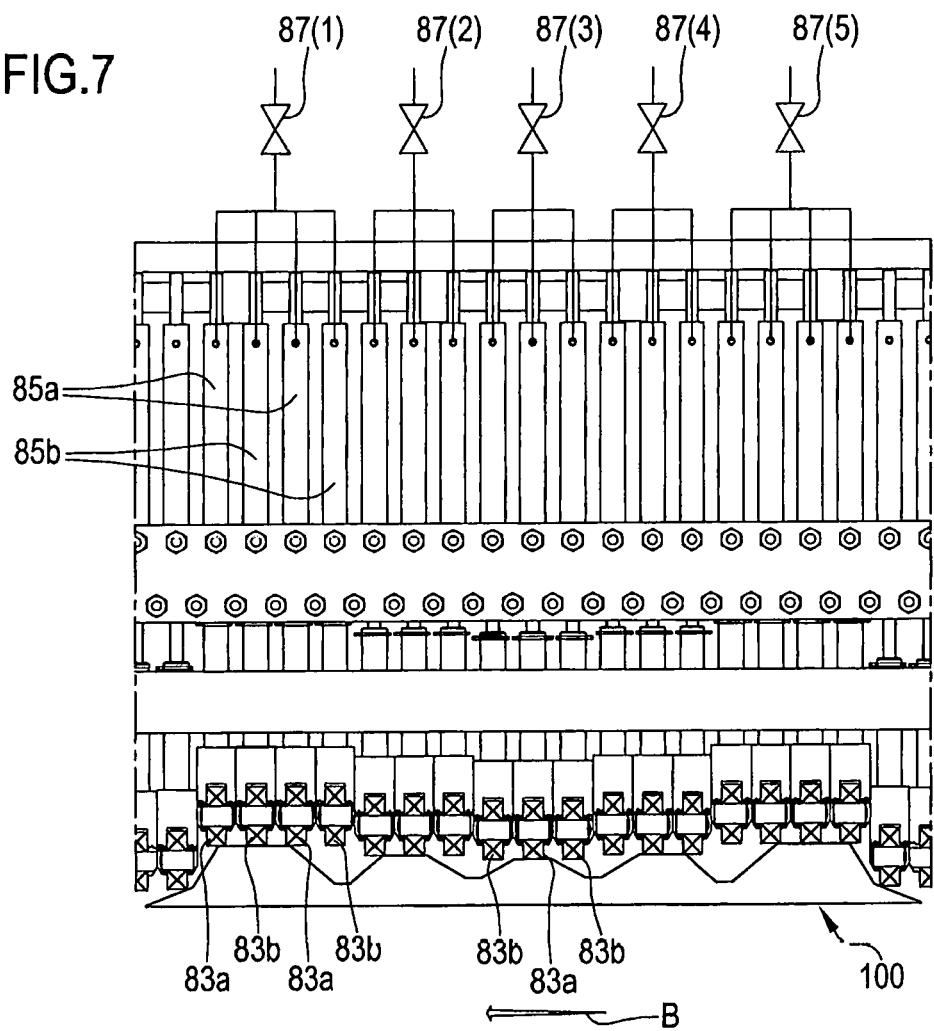
FIG. 7 is an enlarged schematic side view of a portion of a second embodiment of a pressing device of the apparatus of FIG. 1 in a possible operative configuration thereof.

The upper face of at least some of the tread bands 100 used, i.e. the face that when the tread band 100 is deposited on the forming support 500 is in a radially outer position, has an irregular profile (i.e. not flat), as shown in FIGS. 6 and 7.

On the opposite or lower face of each tread band 100 (corresponding to the face that when the tread band 100 is deposited on the forming support 500 is in a radially inner position), a service fabric (not shown) is preferably attached by adhesion. Such a service fabric is preferably made from plastic material, more preferably polythene. It serves to preserve and protect the adhesivity of the aforementioned lower face, such adhesivity being necessary to subsequently obtain a stable adhesion of the tread band 100 to the belt structure of the tyre being processed.

With reference to FIG. 1, the apparatus 1 comprises a storage device 10 for storing the aforementioned tread bands 100, each tread band 100 being provided with a respective service fabric.

The storage device 10 comprises in particular a trolley 11 movable on the ground S. The trolley 11 is provided with a plurality of shelves 15 arranged at different heights with respect to the ground S. Each shelf 15 is intended to support a respective tread band 100. In FIG. 1 each shelf 15 has a tread band 100 arranged thereon.

For the sake of clarity of illustration, reference numeral 15 is associated with only some of the aforementioned shelves.

Each shelf 15 is hinged to the trolley 11 at a respective hinge (not visible) configured to allow the "book-style" opening of the shelf 15.

Each shelf 15 takes up the open position after the tread band 100 supported by it has been picked up, in order to then be able to pick up the tread band 100 supported by the shelf 15 immediately below.

Again with reference to FIG. 1, downstream of the storage device 10, with reference to the feeding direction A, the apparatus 1 comprises a separation device 20 for separating the service fabric from each tread band 100 picked up from the storage device 10.

The separation device 20 comprises a slide 21 movable along a vertical direction upon command of a motor group 22.

The vertical movement of the slide 21 is illustrated in FIG. 1 by the double arrow G. Such a figure also illustrates, with a broken line, the slide 21 in a different operative position thereof.

On the upper surface of the slide 21 a work plane 23 is defined that is configured to support each tread band 100 picked up from the storage device 10 in the removal operations of the service fabric.

As a consequence of the command imparted by the motor group 22, the work plane 23 can be positioned at a plurality of different heights, such heights being selected as a function of the height of the tread band 100 that is wished to be picked up from the storage device 10.

The removal operations of the service fabric are not described since they do not constitute the object of this invention.

As shown in FIG. 1, the apparatus 1 comprises, upstream of the separation device 20, a stop element 18 provided to define the position at which the storage device 10 must be positioned in order to be able to proceed with the operations of picking up the tread bands 100 and removing the service fabric.

Again with reference to FIG. 1, downstream of the separation device 20, with reference to the feeding direction A, the apparatus 1 comprises an auxiliary device 30 for collecting the tread bands 100 picked up from the storage device 10 and from which the service fabric has been removed.

The auxiliary device 30 is preferably housed in a recess R in the ground S, such a recess R having a predetermined depth P.

Such an auxiliary device 30 comprises a plurality of auxiliary belts 31 (four auxiliary belts 31 in the example illustrated herein) arranged one on top of the other and movable as a unit along the vertical direction upon command of a suitable motor group 32 through a suitable motion transfer device 33.

For the sake of clarity of illustration, reference numeral 31 is associated with only one of the aforementioned auxiliary belts, the highest one.

The movement of the auxiliary belts 31 along the vertical direction is illustrated by the double arrow V. The auxiliary belts 31 are also illustrated with a broken line in a different operative position thereof.

As a consequence of the command imparted by the motor group 32, each auxiliary belt 31 can be positioned at a plurality of different heights as a function of the height at which the work plane 23 is positioned and, therefore, the height of the tread band 100 that is wished to be picked up from the storage device 10.

The movement of the auxiliary belts in the longitudinal direction involves the movement of the tread bands 100 along the feeding direction A. In order for each auxiliary belt 31 to be able to be moved in the longitudinal direction independently from the other auxiliary belts 31, each auxiliary belt 31 is associated with a respective motor member 35.

For the sake of clarity of illustration, reference numeral 35 is associated with only one of the aforementioned motor members 35, the one associated with the auxiliary belt 31 arranged highest up.

As shown in FIGS. 1 and 2, the apparatus 1 comprises, downstream of the auxiliary device 30, a feeding device 40 configured to move each of the tread bands 100 coming from the auxiliary device 30 on the forming support 500.

The feeding device 40 comprises a pair of feeding conveyor belts 41a, 41b that are substantially identical, arranged one after the other along the feeding direction A.

The feeding conveyor belt 41a is arranged in a proximal position to the auxiliary device 30 (FIG. 1), whereas the feeding conveyor belt 41b is arranged downstream of the feeding conveyor belt 41a along the feeding direction A and is thus in a proximal position to the forming support 500 (FIGS. 1 and 2).

With reference to FIG. 2, the feeding conveyor belt 41a is defined by a respective band-like element closed in a loop around two opposite support rollers 45a. Similarly, the feeding conveyor belt 41b is defined by a respective band-like element closed in a loop around two opposite support rollers 45b.

The rotation of the aforementioned band-like elements about the respective support rollers 45a, 45b leads to the movement of the respective feeding conveyor belt 41a, 41b in the longitudinal direction, indicated in FIG. 2 by the arrows La and Lb, respectively. In this way the movement of the tread bands 100 towards the forming support 500 along the feeding direction A is obtained.

The movement of each of the feeding conveyor belts 41a, 41b in the longitudinal direction takes place upon command of a respective motor member 42a, 42b. The feeding conveyor belts 41a, 41b can thus be moved in the longitudinal direction independently from each other.

The feeding conveyor belts 41a, 41b are supported by a frame 43 comprising a plurality of uprights 43a.

With reference to FIG. 1, guiding and centring device 50 for guiding and centring the tread bands 100 coming from the auxiliary device 30 is provided between the auxiliary device 30 and the feeding conveyor belt 41a.

As shown in FIG. 2, such a guiding and centring device 50 is fixedly associated with the frame 43 and comprises a plurality of rollers 51 arranged parallel to one another with respective rotation axes perpendicular to the feeding direction A.

Again with reference to FIGS. 1 and 2, at the feeding device 40 the apparatus 1 comprises a detection device 60 for detecting the actual length of the tread band 100 intended to be deposited on the forming support 500.

In the specific example illustrated herein, the detection device 60 comprises a telecamera 61 arranged at a greater height than that of the feeding conveyor belts 41a, 41b and pointed at a detection area defined between the two feeding conveyor belts 41a, 41b. The detection device 60 also comprises a contrast surface 62 arranged at such a detection area, at a lower height with respect to that of the conveyor belts 41a, 41b. The contrast surface 62 is thus inside the area covered by the telecamera 61. The contrast surface 62 is preferably a luminous surface.

A photocell 63 is arranged in a position adjacent to the telecamera 61.

The telecamera 61 and the photocell 63 are operatively connected to a control system 90 of the apparatus 1 (schematically shown only in FIG. 1). Such a connection is schematically indicated in FIG. 1 by the broken line 61a. As explained later on, the photocell 63 and the telecamera 61 transfer respective signals to the control system 90, which takes care of processing the aforementioned signals to finally calculate the actual size of the tread band 100 fed towards the forming support 500.

Again with reference to FIGS. 1 and 2, a deposition device 70 for depositing the tread bands 100 on the forming support 500 is provided downstream of the feeding conveyor belt 41b, and therefore of the detection device 60.

With particular reference to FIG. 2, such a deposition device 70 is pivoted to an end of the frame 43 proximal to the forming support 500 and comprises a plurality of rollers 71 arranged parallel to one another with respective rotation axes perpendicular to the feeding direction A.

The deposition device 70 is novable upon command of a suitable motor group 72 preferably mounted on the deposition device 70. As a consequence of such movement the deposition device 70 can move between a rest position (illustrated in FIG. 1 and with a broken line in FIG. 2) in which it is in a distal position from the forming support 500 and an operative position (illustrated with a continuous line in FIG. 2) in which it is in a proximal position to the forming support 500.

The deposition device 70 comprises a centring device (not shown) configured to allow the correct positioning of the tread band 100 on the forming support 500 along a direction parallel to the rotation axis X.

A pressing device 80 is mounted at a free end of the deposition device 70. The pressing device is intended to press the tread band 100 against the deposition surface 510 as it is progressively deposited on the forming support 500 by the deposition device 70.

As shown in FIG. 1, the pressing device 80 is operatively connected to the aforementioned control system 90. Such a connection is schematically indicated in FIG. 1 by the broken line 80a. As explained later on, the control system 90 transfers a control signal to the pressing device 80 as a function of the actual length of the tread band 100 measured through the detection device 60.

With particular reference to FIG. 2, the pressing device 80 can be moved towards and away from the forming support 500 as a unit, with the deposition device 70 upon command of the aforementioned motor group 72. The pressing device 80 can also be moved with respect to the deposition device 70 towards and away from the forming support 500 upon command of a suitable motor group 81 which is preferably mounted on the pressing device 80. The latter movement takes place when the control system 90 sends the aforementioned control signal to the pressing device 80.

Figure 3:
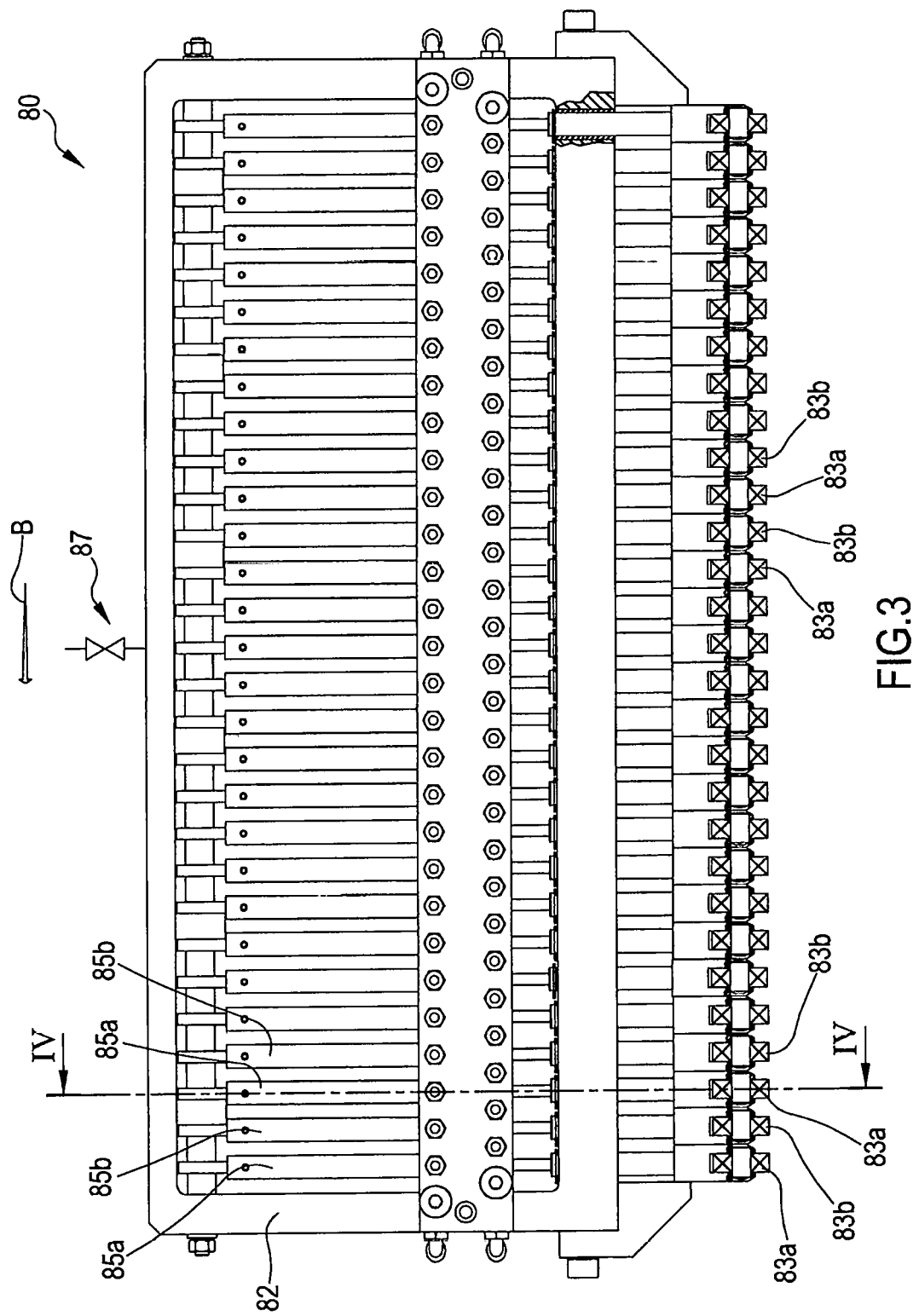
FIG. 3 is an enlarged schematic side view of a first embodiment of a pressing device of the apparatus of FIG. 1.
Figure 5:
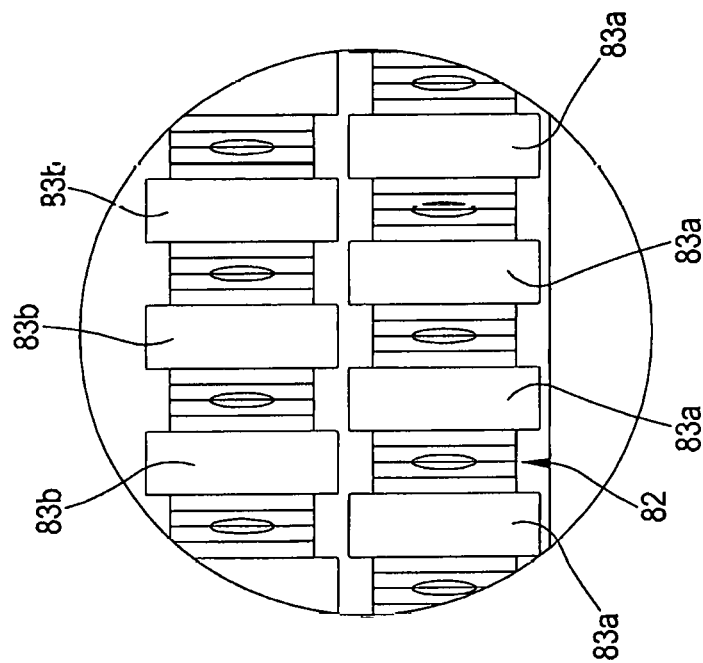
FIG. 5 is an enlarged view from below (i.e. from below the sheet of FIG. 3) of a part of the portion of apparatus of FIG. 3.
Figure 4:
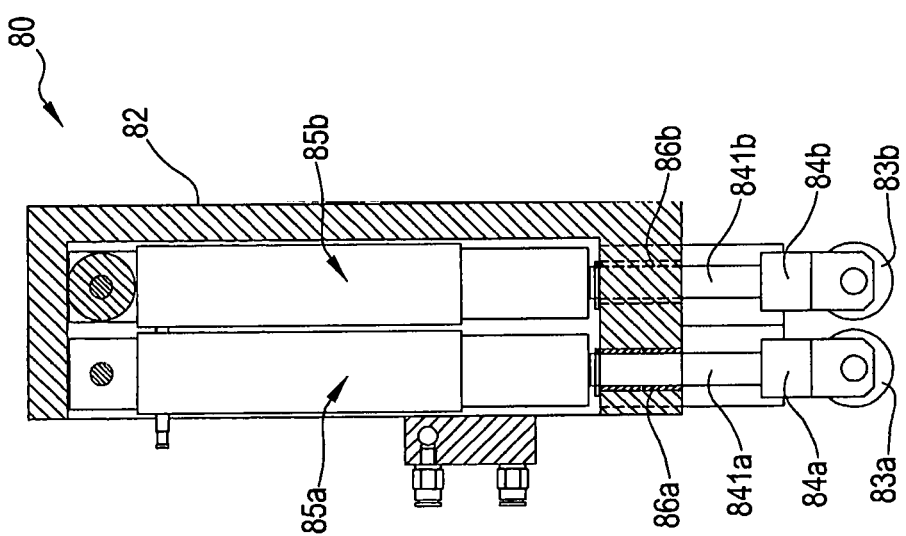
FIG. 4 is a cross section of the portion of apparatus of FIG. 3 taken at the lines IV-IV.

Reference is now made to FIGS. 3-5 and 7. FIGS. 3-5 show some constructive details of a first embodiment of the pressing device 80, whereas FIG. 7 shows the constructive details of an alternative embodiment of the pressing device 80.

What is described below with reference to the embodiment of FIGS. 3-5 also applies to the embodiment of FIG. 7 except where it is expressly stated the contrary.

With reference to FIGS. 3-5, the pressing device 80 comprises a plurality of rollers 83. In particular, it is provided a first row of rollers 83a aligned along a transversal direction B substantially perpendicular to the feeding direction A and a second row of rollers 83b parallel to the first row of rollers 83a. For the sake of clarity of illustration, in FIGS. 3 and 7 reference numerals 83a and 83b are associated with only some of the illustrated rollers.

The rollers 83b are arranged in offset position with respect to the rollers 83a.

As shown in FIG. 4, each roller 83a, 83b is associated with a respective fork 84a, 84b that in turn is associated with an actuator 85a, 85b, preferably of the pneumatic type. Such an actuator 85a, 85b drives the movement of the rollers 83a, 83b along the direction of application of the pressing force.

In the specific example illustrated herein, the guided stem 841a, 841b of each fork 84a, 84b is able to slide inside a respective cylinder. The guided stem of the fork 84a, 84b thus acts as a piston of the aforementioned actuator 85a, 85b.

For the sake of clarity of illustration, in FIGS. 3 and 7 the reference numerals are only associated with only some of the respective elements illustrated.

Each fork 84a, 84b is slidably associated with the frame 82 through the interposition of a respective bushing 86a, 86b intended to prevent the stresses to which the respective roller 83a, 83b is subjected to during the pressing operations of the tread band 100 against the forming support 500 from being able to be transferred to the cylinder 85a, 85b, damaging it.

The actuators 85a, 85b are commanded by one or more electric valves. As a consequence of this command the rollers 83a, 83b are pushed downwards, i.e. against the deposition surface 510 defined on the forming support 500.

In the embodiment shown in FIG. 3, a single electric valve 87 is used, which is intended to command all of the actuators 85a, 85b, whereas in the embodiment illustrated in FIG. 7 a plurality (five in the specific example illustrated here) of electric valves 87(1)-87(5) are used, which are arranged along the transversal direction B, each electric valve 87(1)-87(5) being intended to command a respective group of actuators 85a, 85b.

It is now described a first preferred embodiment of a method for depositing a tread band 100 on the forming support 500 in a process for building tyres for vehicle wheels, preferably for heavy transportation vehicle wheels, in accordance with the present invention. Such a process can be carried out through the apparatus 1 described above.

With reference to FIG. 1, a plurality of tread bands 100 is initially stored in the storage device 10, each tread band 100 with the respective service fabric being positioned on a respective shelf 15 of the trolley 11.

The tread bands 100 are picked up in sequence from the respective shelves 15 and transferred onto respective auxiliary belts 31 of the auxiliary device 30.

Once a tread band 100 has been picked up from a shelf 15 of the storage device 10, such a shelf 15 is made to rotate about the respective hinge and brought into an open position so as to allow the worker to pick up the tread band 100 arranged on the shelf 15 immediately below.

During the movement between storage device 10 and auxiliary device 30 each tread band 100 has the respective service fabric removed at the separation device 20.

Once the auxiliary device 30 has been loaded with a plurality of tread bands 100 without service fabric, the tread bands 100 are transferred in sequence from the auxiliary device 30 to the forming support 500 passing in order through the guiding and centring device 50, the feeding device 40, the deposition device 70 and the pressing device 80, as is described in detail hereinafter.

The movement of each tread band 100 from the storage device 10 to the separation device 20 initially comprises the positioning of the trolley 11 in the respective waiting area close to the separation device 20. In particular, the position of the trolley 11 is determined by the abutment thereof against the stop element 18 properly provided.

The worker then adjusts the height of the work plane 23 so that it is brought to a height substantially equal to the height of the shelf 15 from which it is wished to pick up the tread band 10. Such adjustment is carried out by intervening on a suitable activation software of the motor 22, which in turn commands the upward/downward movement of the slide 21.

Once the work plane 23 has been positioned at the desired height, the worker activates the auxiliary device 30. In particular, once the height of the work plane 23 has been detected, the automatic upward/downward movement of the auxiliary belts 31 is commanded until an auxiliary belt 31 is positioned at the same height as the work plane 23.

The worker then takes care of manually picking up a head portion of the tread band 100, pulling it towards the separation device 20. Such a head portion in particular is rested on the work plane 23 to carry out the removal operations of the service fabric.

The head portion of the tread band 100 without the service fabric is then moved along the feeding direction A until it reaches an auxiliary belt 31 of the auxiliary device 30. At this point the motor member 35 is activated, the auxiliary belt 31 is moved along its longitudinal direction and the tread band 100 is pulled on the auxiliary belt 31 due to the friction between auxiliary belt 31 and tread band 100.

Once the transferal of the tread band 100 on the auxiliary belt 31 is completed, the worker goes back towards the trolley 11 to proceed with the transferal operations of a second tread band 100 from a second shelf 15 of the trolley 11 on the work plane 23 of the separation device 20 and, from there, to a second auxiliary belt 31 of the auxiliary device 30, with simultaneous removal of the service fabric from the second tread band. The aforementioned transferal comprises the positioning of the work plane 23 at a second height substantially equal to that at which the second shelf 15 is located, the automatic positioning of the second auxiliary belt 31 at such a second height and the repetition of the operations described above.

FIG. 1 shows an operative configuration in which a first tread band 100 has been entirely transferred on a first auxiliary belt 31 and another tread band 100 is in the process of being transferred from a shelf 15 immediately below that one that supported the first tread band 100 to an auxiliary belt 31 immediately above the aforementioned first auxiliary belt 31.

The operations described above are repeated until respective tread bands 100 are loaded onto all of the auxiliary belts 31 of the auxiliary device 30.

Thereafter, the aforementioned first tread band 100 is transferred, through the effect of the movement of the auxiliary belt 31, to the feeding device 40.

Such transferal comprises the prior positioning of the aforementioned first auxiliary belt 31 at a height corresponding to that of the free end of the guiding and centring device 50. The first tread band 100 then passes through the guiding and centring device 50 and is transferred firstly over the first feeding conveyor belt 41a and then over the second feeding conveyor belt 41b. In such an operative step the feeding conveyor belts 41a and 41b are moved along the respective longitudinal directions La and Lb (FIG. 2).

During or after the transferal of the tread band 100 on the feeding conveyor belt 41b it is possible to proceed with the loading on the feeding conveyor belt 41a of a second tread band 100, repeating the operations described above with reference to the first tread band 100.

FIG. 2 shows an operative configuration in which a first tread band 100 is arranged on the feeding conveyor belt 41b and a second tread band 100 is arranged on the feeding conveyor belt 41a.

During the movement of each tread band 100 from the feeding conveyor belt 41a to the feeding conveyor belt 41b the measurement of the actual length of the tread band 100 along the feeding direction A is carried out through the detection device 60, as described in detail hereinafter.

If the actual length measured by the detection device 60 is greater than the circumferential length of the deposition surface 510 defined on the forming support 500, the tread band 100 is discarded downstream of the conveyor belt 41b, therefore without being deposited on the forming support 500. If, on the other hand, the actual length measured is lower than or equal to the circumferential length of the deposition surface 510 defined on the forming support 500, the tread band 100 is transferred on the deposition device 70 (which is brought into its operative position indicated with a continuous line in FIG. 2) and is then deposited on the forming support 500 while the latter rotates about its rotation axis X.

When the actual length measured by the detection device 60 is substantially equal to the circumferential length of the deposition surface 510 defined on the forming support 500, while the tread band 100 is deposited on the forming support 100 it is pressed, through the rollers 83a, 83b of the pressing device 80, with a pressing force necessary only to promote the adhesion of the tread band 100 to the deposition surface 510. Such a pressing force does not therefore substantially change the actual length of the tread band itself; in such a case, indeed, this action is not necessary to obtain, when deposition is completed, the precise positioning in abutment of the head end 100a and tail end 100b.

In the cases in which the actual length measured by the detection device 60 is lower than the circumferential length of the deposition surface 510 defined on the forming support 500, while the tread band 100 is deposited on the forming support 100 it is pressed, through the rollers 83a, 83b of the pressing device 80, with a pressing force proportional to the actual length of the tread band 100 measured by the detection device 60, in order not only to allow the adhesion thereof to the deposition surface 510, but also to allow it to be stretched so that, at the end of the deposition operation, said actual length substantially coincides with the circumferential length of the deposition surface 510. The specific pressing force applied is thus selected as a function of the aforementioned actual length measured.

The rollers 83a, 83b are pressed against the tread band 100 after the opening of the electric valve 87 (in the embodiment of FIG. 3) or of the electric valves 87(1)-87(5) (in the embodiment of FIG. 7) and the consequent activation of the actuators 85a, 85b, upon specific command sent by the control unit 90.

In the embodiment of FIG. 3, all of the rollers are pushed against the deposition surface 501 with the same force and thus exert the same pressing force on the tread band 100 being deposited on the forming support 500.

On the other hand, in the embodiment of FIG. 7, thanks to the use of many electric valves 87(1)-87(5), each of which is intended to command a respective group of actuators 85a, 85b, and consequently rollers 83a, 83b, the pressing force applied to the tread band 100 being deposited on the forming support 500 can have different values along the transversal direction B. It is thus possible to ensure that higher pressing forces are applied on possible portions of the tread band 100 having a shorter length than the other portions, whereas lower pressing forces are applied on possible portions of the tread band 100 having greater length than the other portions.

The aforementioned pressing force thus produces (when the actual length measured by the detection device 60 is lower than the circumferential length of the deposition surface 510) a stretching of the tread band 100 such as to allow, when deposition is completed, the precise mutual positioning in abutment of the head and tail end 100a, 100b of the tread band 100 deposited on the forming support 500. In this way a high-quality head-tail joint without overlapping is obtained.

Thanks to the arrangement of the rollers 83a, 83b on two parallel rows, the pressure is exerted instant by instant on two distinct circumferentially adjacent portions of tread band 100.

The Applicant has verified that it is possible to apply to the tread band 100 a pressing force of magnitude such as to produce a stretching of the tread band 100 up to a maximum of 5%, preferably comprised between 1% and 3%. Just as an example, with reference to a tread band 100 having an actual length equal to about 3 metres, the Applicant has obtained a stretching of about 9.5 cm.

The pressing force to be applied is obtained from a correlation table (or curve) between pressing force and actual length defined as a function of the particular geometry of the tread band 100 and of the compound used and acquired in a previous calibration process carried out on a tread band having the same geometry and compound.

Such a correlation table (or curve) is stored in the control system 90.

Such a table (or curve) can be modified in real time based on the feedback provided by the worker following the analysis of previous deposition processes of tread bands 100 preferably having the same geometry and compound.

In particular, the worker from time to time detects whether the length correction applied to the tread band 100 after the application of the pressing force was sufficient to achieve the precise mutual positioning in abutment of the head end 100a and tail end 100b of the tread band 100 deposited on the forming support 500 and, through a suitable calculation algorithm integrated in the control system 90, which takes into account all of the feedback received, the control system 90 automatically adapts in real time the correlation table (or curve) to ensure an increasingly precise join between head end 100a and tail end 100b.

At the end of the deposition of the tread band 100 on the forming support 500 the head-tail joint of the tread band 100 is consolidated by increasing the pressing force by a predetermined value and making the forming support 500 carry out an oscillating forward/backward movement a predetermined number of times (at least once, more preferably at least a couple of times) about the position in which the aforementioned joint is located.

In order to obtain the desired stretching of the tread band 100 deposited on the forming support 500 it is possible to aid the pressing action exerted by the rollers 83a, 83b with an increase in the rotation speed of the forming support 500 by a predetermined value selected as a function of the pressing force exerted by the rollers 83a, 83b, keeping the speed of longitudinal movement of the conveyor belts 41a, 41b constant.

The measurement of the actual length of the tread band 100 can be obtained, for example, as described hereinafter.

The tread band 100 is transferred from the conveyor belt 41a to the conveyor belt 41b moving the aforementioned belts with identical and constant speeds, thus without foreseeing stops or slowing down of the aforementioned belts.

Through the photocell 61 the instant of passage of the head end 100a of the tread band 100 is detected. From this moment the count of an encoder (not shown) starts and an instant at which, as a function of the speed of movement of the conveyor belts 41a, 41b, the tread band 100 has moved by a length equal or close to its nominal length is determined.

At this instant, therefore, a portion of tail end 100b of the tread band 100 passes under the telecamera 61. The control unit 90 at this instant activates the telecamera 61 so as to acquire an image of the portion of tail end 100b of the tread band 100.

Such an image is then compared with a reference image acquired in a previous calibration process in which a template of known length was used. Based on said comparison and on the previous detection of the instant of passage of the head end 100a of the tread band 100 the control system 90 calculates the actual length of such a tread band 100 and based on such an actual length suitably commands the electric valve 87 (in the embodiment of FIG. 3) or the electric valves 87(1)-87(5) (in the embodiment of FIG. 7) so that the rollers 83a, 83b impart on the tread band 100 being deposited on the forming support 500 the pressing force(s) suitable for allowing, at the end of the deposition of the tread band 100 on the forming support 500, a precise join of the head end 100a and tail end 100b of the tread band 100.

In order to be able to carry out the aforementioned comparison in a precise and reliable manner, through a suitable calculation algorithm integrated in the control system 90, the position of a first theoretical line representative of the tail end 100b of the tread band 100 is determined in each image which is acquired. Such a theoretical line is represented in FIG. 6 by a dotted and dashed line indicated with T; it substantially defines an interpolation line of the actual profile (typically irregular) of the tail end 100b of the tread band 100. The irregularity of the aforementioned profile is the consequence of the cutting carried out along a predetermined direction that is inclined with respect to a plane perpendicular to the longitudinal direction of the tread band 100.

Of course, a man skilled in the art can bring further modifications and variants to the invention described above in order to satisfy specific and contingent application requirements, said variants and modifications in any case being within the scope of protection as defined by the following claims.

The invention claimed is:

1. A method for depositing a piece of band-like elastomeric element on a forming support in a process for building a tyre for vehicle wheels, comprising:
   providing a reference image acquired in a previous calibration process in which a template of a known length of the band-like elastomeric element was used;
   feeding a piece of band-like elastomeric element having a predetermined nominal length towards said forming support along a predetermined feeding direction;
   measuring an actual length of said piece of band-like elastomeric element along said feeding direction via the following steps:
   a) detecting a first instant of passage of a head end of said piece of band-like elastomeric element;
   b) determining a second instant of passage of a tail end of said piece of band-like elastomeric element as a function of said first instant of passage, said nominal length and a speed of movement of the band-like elastomeric element;
c) acquiring a single image of the tail end at the second instant determined in step b); and
d) calculating the actual length of said piece of band-like elastomeric element based on the detection of said first instant and second instant;

wherein calculating the actual length of said piece of band-like elastomeric element comprises:

comparing the single image with the reference image; and
determining the actual length of said piece of band-like elastomeric element based on a comparison between said single image and said reference image, if said actual length is lower than or equal to a circumferential length of a deposition surface defined on the forming support, depositing said piece of band-like elastomeric element on said deposition surface while said forming support rotates about a rotation axis thereof;

if said actual length is lower than said circumferential length of said deposition surface, then:
i) obtaining from an adaptive correlation table a pressing force that corresponds to the actual length; and
ii) during the deposition of said piece of band-like elastomeric element on said deposition surface pressing said piece of band-like elastomeric element on said deposition surface with said pressing force, thereby stretching said piece so that, at the end of the deposition of said piece, a corrected actual length of said piece that substantially coincides with said circumferential length of said deposition surface is obtained.

2. The method according to claim 1, wherein said piece of band-like elastomeric element is a tread band.

3. The method according to claim 1, further comprising, updating the adaptive correlation table in real time.

4. The method according to claim 1, wherein determining said second instant comprises:

determining, starting from said first instant, the instant at which said piece of band-like elastomeric element moved along said feeding direction by a length equal or close to said nominal length.

5. The method according to claim 1, wherein said single image and said reference image are acquired through a telecamera.

6. The method according to claim 1, wherein comparing said single image with the reference image comprises:

determining in said single image the position of a first theoretical line representative of said tail end.

7. The method according to claim 1, comprising, at the end of the deposition of said piece of band-like elastomeric element on said deposition surface:

reversing at least once the direction of rotation of said forming support;
increasing said pressing force by a predetermined value.

8. The method according to claim 1, wherein pressing said piece of band-like elastomeric element comprises pressing, instant by instant, two circumferentially adjacent portions of piece deposited on said deposition surface.

9. The method according to claim 1, wherein said pressing force has different values along a transversal direction substantially perpendicular to said feeding direction.

10. The method according to claim 1, wherein said piece of band-like elastomeric element is moved along said feeding direction up to said forming support with a substantially constant feeding speed.

11. The method according to claim 1, comprising, during the deposition of said piece of band-like elastomeric element on said deposition surface, increasing the rotation speed of said forming support by a predetermined value selected as a function of said pressing force.

12. The method according to claim 1, wherein said pressing force produces a stretching of said piece of band-like elastomeric element up to a maximum of 5% of its actual length measured along said feeding direction.

13. The method according to claim 1, wherein if said actual length is greater than said circumferential length of said deposition surface defined on the forming support, said piece of band-like elastomeric element is discarded.

* * * * *